March 18, 1958
G. L. CARLSON
2,827,549
ADAPTER FOR MAKING ARC WELDS WITH INERT GAS ATMOSPHERE
Filed March 29, 1954
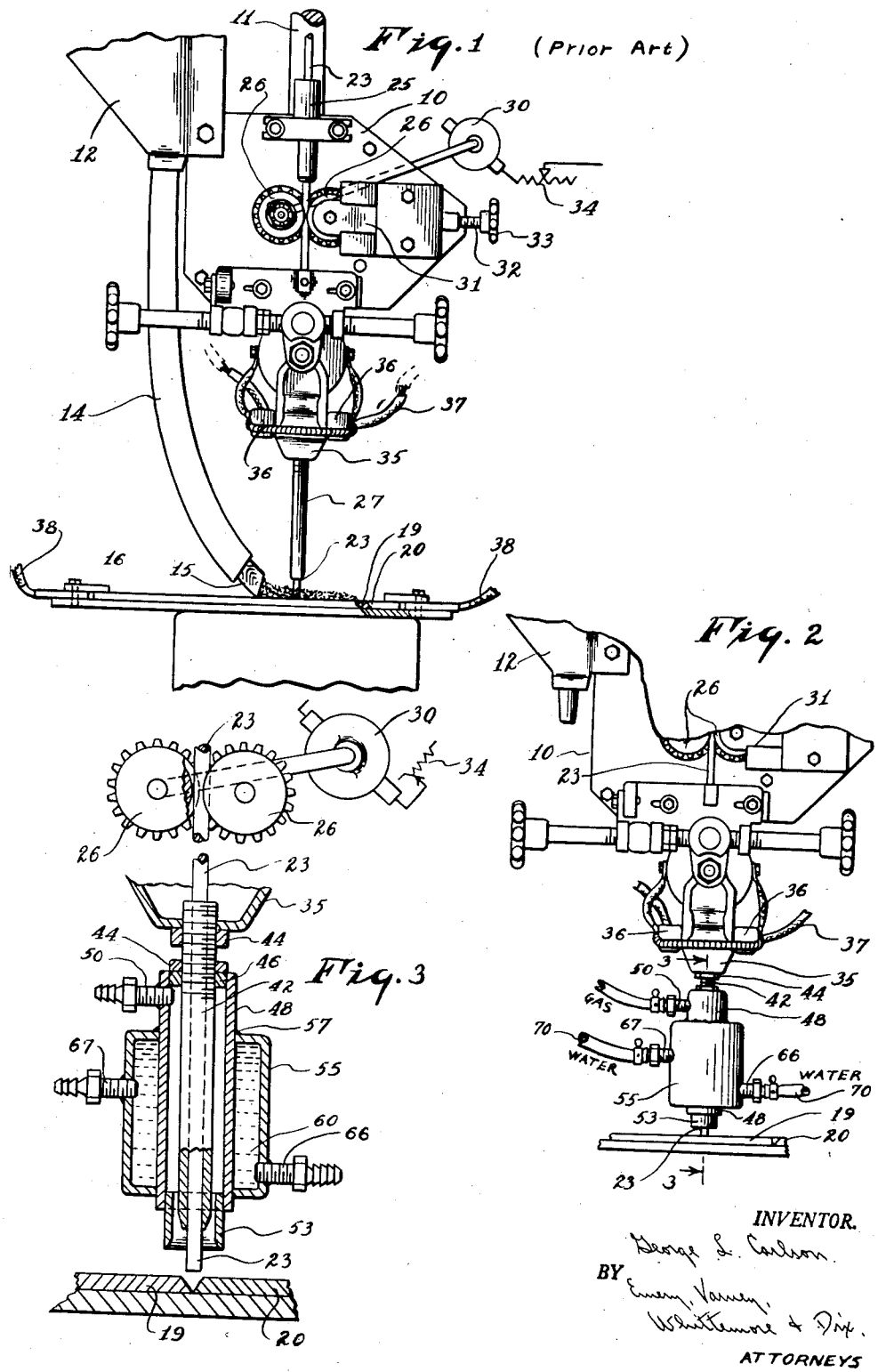
INVENTOR.
George L. Carlson
BY Emery, Varney,
Whittemore & Dix
ATTORNEYS

United States Patent Office 2,827,549
Patented Mar. 18, 1958

2,827,549

ADAPTER FOR MAKING ARC WELDS WITH INERT GAS ATMOSPHERE

George L. Carlson, North Bergen, N. J., assignor to Coast Metals, Inc., Little Ferry, N. J., a corporation of Delaware Application March 29, 1954, Serial No. 419,341

4 Claims. (Cl. 219—130)

This invention relates to electric arc welding and more especially to apparatus for making welds with a depositing electrode which is shielded by a gas shield.

It is an object of the invention to provide improved apparatus for making electric welds with a gas-shielded arc. It is another object of the invention to provide apparatus which can be attached to a conventional, submerged arc welding head to convert the welding head of the apparatus for making welds with an inert gas shield around the arc in place of the flux which is used with the submerged arc.

In welding operations, the submerged arc weld is particularly suited for certain types of work, whereas welding apparatus, in which the operator can watch the progress, is more suitable for other types of work and for certain shapes of work. Submerged arc welding equipment is expensive, and so is apparatus for making gas shielded arc welds with a depositing electrode. This invention provides an attachment, which is simple and inexpensive, for using a submerged arc welding head to make welds with a gas shielded arc.

Other objects, features and advantages of the invention will appear or be pointed out as the description proceeds.

In the drawing, forming a part hereof, in which like reference characters indicate corresponding parts in all the views, Figure 1 is a side elevation of a welding head for making submerged arc welds;

Figure 2 is a view, similar to Figure 1, but with the welding head converted into a gas shielded arc welder by means of the attachment of this invention; and Figure 3 is a sectional view taken on the plane 3—3 of Figure 2, but with the hose fittings and feed rolls rotated 90 degrees into the plane of section.

Figure 1 shows a welding head including a frame 10 carried by a support 11 for moving the frame in a direction in which the weld is to be made. A flux hopper 12 is connected with the frame 10 and has a discharge spout 14 with its outlet end 15 located adjacent to a seam 16 between two work pieces 19 and 20, which are to be welded together.

The weld is made with a bare wire electrode 23, which may be fed from an overhead reel or spool, passing downwardly through an upper guide 25, between feed rolls 26 and through a portion of the frame 10 to a lower guide sleeve 27.

The electrode 23 emerges from the lower end of the guide sleeve 27 at a region adjacent to the seam 16. The welding arc is discharged between the electrode 23 and the work pieces 19 and 20 at a region spaced rearwardly from the flux spout 14 so that the seam 16 is completely blanketed with flux and the lower end of the electrode submerged in the flux. This submerged arc welding is a standard technique and well understood in the art.

The feed rolls 26 advance the electrode as the metal from the lower end of the electrode is deposited in the seam. The left-hand feed roll 26 is driven, at a controlled speed, by a motor 30. This motor is illustrated diagrammatically and it is shown with an adjustable rheostat 34 which is merely representative of means for controlling the speed of the electrode feed.

The right-hand feed roll 26 is an idler for holding the electrode 23 in firm frictional contact with the driven feed roll 26. The idler feed roll 26 is carried by a frame 31 which is adjustable along a fixed guide on the frame of the welding head; and this frame 31 is adjusted toward and from the driven feed roll 26 by a lead screw 32 having a knob 33 for manual-operation of the lead screw.

The frame 10 has a bottom wall 35 into which the guide sleeve 27 is threaded. Just above the upper end of the guide sleeve 27 there are brushes 36 for supplying electric current to the electrode 23, and these brushes are supplied with power through a conductor 37 leading to a welding generator. The other side of the generator circuit is connected to the work pieces 19 and 20 through a conductor 38. The construction thus far described is conventional, but a description of it is necessary for a complete understanding of the attachment provided by this invention and the new combination which this attachment provides with certain parts of the welding head.

Figure 2 shows the apparatus of Figure 1 with the attachment of this invention applied to the welding head. The flux spout 14 is removed, but this is merely a matter of convenience since the flux spout is not used with this invention.

The attachment may be attached to the bottom wall 35 in place of the sleeve 27, or the sleeve 27 can be removed, assembled with the other parts of the attachment, and then screwed back into the bottom wall 35. Whether the attachment has its own electrode guide, or uses the sleeve 27 as its electrode guide, the preferred construction uses an electrode guide sleeve 42 which is the same as the guide sleeve 27 of the submerged arc-welding head.

In the description which follows, the attachment of this invention will be described with its own electrode guide 42, but it will be apparent that the sleeve 27 can be used as this guide. The upper end of the sleeve 42 screws into the bottom wall 35 and it is locked in place by a lock nut 44 located on the threads of the sleeve 42 immediately below the bottom wall 35.

The sleeve 42 screws through a collar 46 of the attachment, and the sleeve 42 is locked against longitudinal displacement with respect to the collar 46 by another lock nut 44.

A cylindrical shell 48 fits around the collar 46 and has its upper end integrally secured to the collar as by silver solder. There is an inlet fitting 50 communicating with the interior of the cylindrical shell 48. This inlet fitting 50 is preferably located near the upper end of the cylindrical shell 48 and is connected with a hose for supplying gas which is used to shield the arc.

The lower end of the cylindrical shell 48 terminates at a level slightly above the bottom of the electrode guide sleeve 42. During the operation of the apparatus, gas from the inlet fitting 50 enters the cylindrical shell 48 and flows downwardly around the sleeve 42 to the bottom of the annular space enclosed by the shell 48 and sleeve 42. In order to concentrate the shield provided by the gas from the shell 48, there is a bushing 53 at the lower end of the shell 48.

In the construction illustrated, the bushing 53 is cylindrical and has an outside diameter which fits tightly into the lower end of the shell 48 with a press fit. The bushing 53 controls the flow of gas from the lower end of the shell 48, and confines the flow of gas to the region immediately surrounding the arc. The lower end of the bushing 53 is flared to produce a smooth, non-turbulent flow of the gas stream downwardly around the region of the arc.

A water jacket 55 surrounds the cylindrical shell 48. In the illustrated construction, the water jacket does not extend all the way to the top of the cylindrical shell, but has its top wall far enough below the top of the shell to leave space for the gas inlet fitting 50. The top wall of the water jacket 55 is attached to the outside wall, of the cylindrical shell 48, by silver solder 57.

The water jacket 55 has an inlet fitting 66 and an outlet fitting 67. These fittings are preferably near opposite ends of the water jacket and on opposite sides of it. The inlet 66 is shown near the upper end of the water jacket and the outlet 67 near the lower end. There are hoses 70 connected to the fittings 66 and 67; these hoses lead to water circulating means.

When the attachment of this invention is connected with the frame 10, the electrode 23 is advanced by the electrode feed rolls 26 in the same manner as when using the apparatus for submerged arc welding. The brushes 34 supply current to the electrode as before, and the sleeve 42 guides the electrode as it is fed downwardly. Thus, the attachment uses the same electrode feed mechanism and current supply means as for submerged arc welding.

The attachment is easily connected with the submerged arc welding head with a minimum of dismantling; and it is of simple and rugged construction with no moving parts. Thus, at a very small cost, the submerged arc welding head is converted into apparatus for making welds with a gas-shielded arc.

The preferred construction has been illustrated and described but changes and modifications can be made and some features can be used in different combinations without departing from the invention as defined in the claims.

I claim as my invention:

1. In an arc welding equipment of the class wherein a welding head is supported above a work piece and is moved parallel to the work piece along a path corresponding to an edge to be welded, and the welding head includes an original electrode guide and feed means for advancing an electrode through the guide and beyond the end thereof to a predetermined level adjacent to the work piece, and means for supporting a flux holder with a discharge outlet adjacent to the electrode and at said predetermined level, and the electrode guide has an upper end that screws into a threaded opening in a part of the welding head below the feed means, the combination with said welding head of apparatus that converts the welding equipment into a gas-shielded welding device, said apparatus comprising a self-contained unit with a single detachable connecting means for securing the unit to the welding head, a first downwardly extending sleeve in which an electrode is held, a second sleeve surrounding the first sleeve and spaced therefrom to provide an annular chamber between the sleeve and open at its lower end, the second sleeve having its upper end at a substantial distance below the upper end of the first sleeve and the second sleeve having a gas outlet at its open lower end near the arc end of the electrode, and the first sleeve extending downwardly to a location near the lower end of the second sleeve, an annular end wall closing the upper end of the gas chamber between the sleeves, means for supplying gas to the annular chamber including a fitting extending through the second sleeve near its upper end for admitting gas into the chamber between the sleeves, and a water jacket surrounding the second sleeve from a location below the fitting to a location near the lower end of the second sleeve, and fittings extending through the sides of the water jacket at locations below the gas fitting for the flow of water into and out of the water jacket.

2. The arc welding equipment described in claim 1, and in which the single detachable connecting means includes a threaded upper end of the downwardly extending sleeve in which the electrode is held, and the annular end wall closing the upper end of the gas chamber is threaded and screws over the threaded upper end of said downwardly extending sleeve.

3. The arc welding equipment described in claim 1, and in which the second sleeve has its lower end shaped to guide the gas flow in the region of the arc to obtain a smooth, non-turbulent flow of the gas stream downwardly around the arc.

4. The arc welding equipment described in claim 1, and in which the lower end of the downwardly extending sleeve in which the electrode is held has a decreasing outside diameter near its lower end, and the second sleeve has an increasing inside diameter near its lower end for obtaining a smooth, non-turbulent flow of the gas stream downwardly around the region of the arc.

References Cited in the file of this patent

UNITED STATES PATENTS

| 2,504,868 | Muller | Apr. 18, 1950 |
| 2,510,205 | Baird | June 6, 1950 |
| 2,522,482 | Olzak | Sept. 12, 1950 |

FOREIGN PATENTS

| 16,293 | Australia | Feb. 8, 1935 |
| 394,773 | Great Britain | July 6, 1933 |
| 495,299 | Great Britain | Nov. 10, 1938 |